United States Patent Office 2,943,690
Patented July 5, 1960

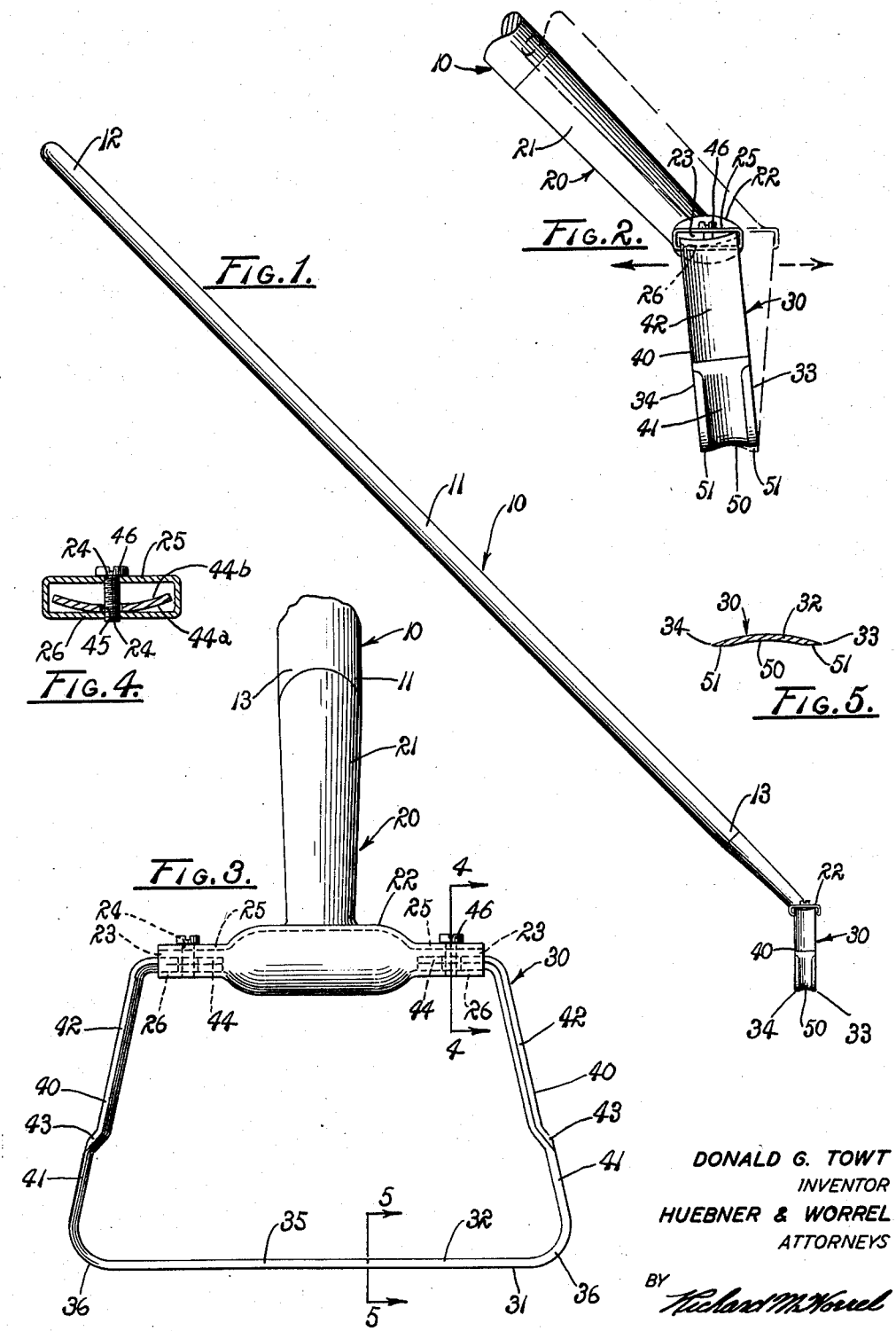

2,943,690

PENDULUM CULTIVATING TOOL

Donald G. Towt, 1601 19th St., Kingsburg, Calif.

Filed Dec. 13, 1957, Ser. No. 702,656

1 Claim. (Cl. 172—376)

The present invention relates to a hand tool for cultivating purposes and more particularly to improvements in a cultivating tool having a pendulum action.

Hand cultivating tools are well-known for working the soil in gardens and for light agricultural uses on ranches and farms. Probably the oldest and most well-known tool of this nature is the hoe. Of this class of hand tools, a cultivating tool having a so-called pendulum action and offering certain advantages over the hoe has been well-known in the past.

The conventional pendulum action tool includes a U-shaped mounting member having a central portion connected to a lower end of an elongated handle and a pair of spaced parallel endwardly extended arms having laterally outwardly extended pairs of ears, a U-shaped blade including a lower central portion and a pair of upwardly extended side flanges in outwardly overlapping relation with the downwardly extended arms of the mounting bracket and positioned between the ears on their respective sides of the bracket, and pivot bolts extended through the overlapped bracket side arms and the blade side flanges. The blade has an inwardly disposed surface and this surface is sharpened along the edges of the central portion. In use, the blade is oscillated, pendulum fashion, forwardly and rearwardly in earth engagement by means of the handle. This cultivates the subsurface soil without disturbing the valuable top soil as does a hoe.

Although known constructions of pendulum cultivating tools have operated satisfactorily when the blade is sharp, these prior art devices have been relatively expensive and heavy. Further, it is difficult and time consuming to sharpen the blade of a conventional cultivating tool of this nature; since the knife edges are on the top or inwardly disposed surface of the blade, it is usually necessary to sharpen the blade on a grinding machine.

Accordingly, it is an object of the present invention to provide improvements in a pendulum action cultivating tool.

Another object is to provide a pendulum cultivating tool having a more effective cultivating action on each stroke of the tool.

Another object is to provide a pendulum cultivating tool having a more effective angle of incidence on the cutting edges of the blade.

Another object is to facilitate automatic sharpening of a blade in a pendulum cutting tool.

Another object is to minimize the expense of manufacturing a pendulum cultivating tool.

Another object is to provide a simplified and lightweight construction of a pendulum cultivating tool.

These, together with other objects, will become more fully apparent upon reference to the following description and accompanying drawing.

In the drawing:

Fig. 1 is a side elevation of a cultivating tool embodying the principles of the present invention.

Fig. 2 is a somewhat enlarged fragmentary side elevation of the lower end of the tool of Fig. 1 showing an alternate position of operation in dashed lines.

Fig. 3 is a still further enlarged fragmentary front view of the lower portion of the tool shown in the same position as in full lines in Fig. 2.

Fig. 4 is a somewhat enlarged transverse section taken on line 4—4 of Fig. 3.

Fig. 5 is a somewhat enlarged transverse section taken on line 5—5 of Fig. 3.

Referring more particularly to the drawing, a pendulum action, manually operated, cultivating tool is generally indicated by the numeral 10. The tool includes an elongated cylindrical handle 11 of well-known form having an upper end portion 12 and a lower end portion 13.

A blade mounting member 20 includes an upper substantially tubular shank 21 tightly frictionally fitted over the lower end portion 13 of the handle 11 and an elongated sleeve 22 of substantially rectangular cross section perpendicularly secured to the shank and substantially equidistantly outwardly extended from the handle in opposite directions from the shank. The sleeve provides laterally outwardly opening sockets 23 of predetermined rectangular cross-sectional shape. Further, the sleeve provides transversely extended opposed pairs of upper and lower apertures 24 in opposite ends thereof and in upper and lower walls 25 and 26 thereof.

A substantially U-shaped earth working blade 30 provides an outwardly disposed surface 31, an inwardly disposed surface 32, and a pair of longitudinally extended side edges 33. The blade has a lower rectangular central portion 35 providing opposite ends 36. In addition, the blade includes a pair of rectangular side portions 40 convergently upwardly extended from the opposite ends 36 of the central portion 35. Each side portion includes an outer lower section 41, an inwardly offset upper section 42, and an intermediate section 43 integrally rigidly interconnecting the upper and lower sections. The side portions terminate in upper concavo-convex male ends 44 substantially parallel to said central portion and which are releasably individually fitted in the outwardly opening sockets 23 of the sleeve 22. It is to be noted that the male ends of the blade are smaller in width and thickness than the sleeve sockets so as to fit loosely therein. The male ends have inwardly disposed convex surfaces 44a and outwardly disposed concave surfaces 44b constituting longitudinal sections of a cylinder. The primary purpose of providing the loose fit is to enable a pendulum action of the blade relative to the handle 11. The convex inwardly disposed surfaces roll or rock back and forth on the lower wall 26 of the sleeve so that the blade is movable between limited positions on opposite sides of the handle in an arcuate path substantially concentric to a blade axis extended transversely of the handle through the sleeve. The pendulum movement of the blade is, of course, limited by engagement of the male ends with the upper and lower walls 25 and 26 of the sleeve. The male ends provide openings 45 respectively in alignment with corresponding apertures 24, and bolts 46 are downwardly extended through the aligned apertures and openings and screw-threadably connected to the sleeve. As best indicated in Fig. 4, the outside diameter of the bolts is less than the diameter of the openings so as to accommodate the described rocking of the blade. In addition to guiding and centralizing the rocking of the blade, the bolts prevent inadvertent removal of the male ends from the sockets during vigorous hoeing movements.

The central portion 35 of the blade 30 has a lower concave surface 50 extended longitudinally thereof for a purpose to be described. Further, the edges 33 of the blade are sharpened along sections 51 on the outwardly disposed surface 31 longitudinally of the central portion and partially upwardly along the side portions. It will be noted in Fig. 5 that the central portion provides a convex upper surface and a concave lower surface of substantially the same radius so that it is of substantially uniform thickness between its edges. The edges of the concave surface are sharpened in a common flat plane in chordal relation to said convex and concave surfaces. The side portions 40 of the blade also have outwardly disposed concave surfaces primarily as a matter of constructional convenience rather than functional advantage. That is, the blade may be made from a strip of metal in which the described concavo-convexity is initially provided prior to bending into the U-shape specified. Such concavo-convex form, however, serves to impart greater rigidity to the side portions.

Operation

The operation of the described embodiment of the subject invention is believed to be readily apparent and is briefly described at this point.

The tool 10 of the subject invention is adapted for use in home gardens as well as for certain larger scale agricultural plots. The handle 11 is grasped in the hands, in the manner of a hoe, and the outwardly disposed surface 50 of the central portion 35 of the blade 30 is placed in the soil to be cultivated. Thereupon, the handle is alternately shoved forwardly and pulled rearwardly in a rather rapid succession of strokes. On the forward stroke, the blade 30 is pivoted rearwardly in the sockets 23 relative to the handle thereby to tilt the central portion 35 relatively forwardly and downwardly into the earth, as seen in dashe dlines in Fig. 2. As the forward stroke is continued, the forwardly disposed edge 33 slices through the soil severing weeds in its path. On the rearward stroke, the blade pivots relatively forwardly so that the central portion is tipped rearwardly and downwardly relative to the soil, as seen in Fig. 2 in full lines. As the rearward stroke is continued, the rearwardly disposed edge 34 slices through the soil. It will be evident, therefore, that continued oscillation or rocking of the blade, that is forward and rearward movement of the handle, will alternately bring the forward edges of the blade into effective cultivating action. It is found that the described pendulum action enables the removal of weeds and other surface growth without displacing valuable top soil. This is true since the top soil simply slides over the inwardly disposed surface 32 of the central portion 35 while the forward and rearward edges effect cultivation.

The provision of a concave surface 50 and the sharpened sections 51 on the outwardly disposed surface 31 of the blade 20 is doubly advantageous. First, the knife edges 51 are naturally honed or sharpened during normal operation of the tool. Further, if this is insufficient sharpening, the central portion 35 may be placed on an adjacent concrete sidewalk or curb and the tool stroked forwardly and rearwardly as described above whereby the edges are sharpened.

Of further significance are the inwardly convergent side portions 40 of the blade. Cultivation may be effected by the subject tool 10 immediately adjacent to fences, walls, curbs, and the like, inasmuch as either end 36 of the central portion 35 can be brought into direct contact with such fences or curbs. Since the side portions upwardly converge, they do not interfere with this use of the tool.

In practice it is found that the subject tool is highly effective for mulching, aerating, weeding, and otherwise cultivating the subsurface soil. This is done with a minimum of molestation of the top soil and the exposure of additional weed seeds for germination. The construction of the tool facilitates its sharpening and enables its use along fences, sidewalks, curbs, and other obstructions. It has been found specifically to be useable in home garden plots and in cultivation of cotton but obviously is not limited to such uses.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A pendulum action cultivating tool comprising an elongated handle having a lower end; a blade mounting member including an elongated sleeve having opposite end portions of substantially rectangular cross section providing substantially parallel spaced upper and lower walls and being transversely mounted on the lower end of the handle, the end portions of the sleeve constituting sockets laterally disposed from the handle; a substantially U-shaped blade having a pair of opposed side portions, a longitudinally substantially straight lower earth working central portion interconnecting the side portions, and male ends individually angularly extended from the side portions inwardly toward each other in spaced substantially parallel relation to the central portion, the male ends being releasably individually loosely fitted in the sockets of the sleeve and having lower convex surfaces constituting longitudinal segments of a cylinder rollably engaging the lower wall of the sleeve for oscillating movement of the blade relative to the handle, said male ends also having openings therein located within the sockets; and bolts extended between the upper and lower walls at opposite end portions of the sleeves and loosely extended through the openings in the male ends for releasably holding said male ends in the sockets and for accommodating said rollable movement, the distance between the openings in the male ends of the blade and the side portions respectively adjacent to their male end portions being greater than the distance between said bolts and their respective adjacent ends of the sleeve whereby the side portions of the blade are maintained in spaced relation to the opposite end portions of the sleeve.

References Cited in the file of this patent

UNITED STATES PATENTS

| | | |
|---|---|---|
| 54,916 | Jenkins | May 22, 1866 |
| 1,017,048 | Glatt | Feb. 13, 1912 |
| 1,591,280 | Carr | July 6, 1926 |
| 2,037,480 | Nedbal | Apr. 14, 1936 |
| 2,539,351 | Gress | Jan. 23, 1951 |
| 2,797,628 | Schrag | July 2, 1957 |